(12) United States Patent
Chen

(10) Patent No.: US 11,265,406 B2
(45) Date of Patent: Mar. 1, 2022

(54) ELECTRONIC DEVICE

(71) Applicant: BEIJING XIAOMI MOBILE SOFTWARE CO., LTD., Beijing (CN)

(72) Inventor: Chaoxi Chen, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 234 days.

(21) Appl. No.: 16/453,419

(22) Filed: Jun. 26, 2019

(65) Prior Publication Data

US 2020/0007668 A1    Jan. 2, 2020

(30) Foreign Application Priority Data

Jun. 27, 2018   (CN) .......................... 201810681248.7

(51) Int. Cl.
*H04M 1/02* (2006.01)
*G01S 7/481* (2006.01)
*G01S 17/08* (2006.01)

(52) U.S. Cl.
CPC ......... *H04M 1/0266* (2013.01); *G01S 7/4813* (2013.01); *G01S 17/08* (2013.01)

(58) Field of Classification Search
None
See application file for complete search history.

(56) References Cited

U.S. PATENT DOCUMENTS

| | | | |
|---|---|---|---|
| 8,818,450 B2 | 8/2014 | Caballero | |
| 2005/0201715 A1* | 9/2005 | Ellwood | G02B 6/2746 385/147 |
| 2012/0146973 A1* | 6/2012 | Kaji | G02F 1/1336 345/207 |
| 2016/0020261 A1* | 1/2016 | Kim | H01L 51/5275 362/235 |
| 2016/0338457 A1* | 11/2016 | Gharabegian | A45B 25/16 |
| 2017/0134547 A1* | 5/2017 | Zeng | H04M 1/0283 |
| 2017/0286783 A1 | 10/2017 | Yim | |
| 2018/0292568 A1* | 10/2018 | Chen | G01S 7/4813 |
| 2019/0196546 A1* | 6/2019 | Wu | A45C 11/00 |
| 2019/0278332 A1* | 9/2019 | Ma | G06F 1/1656 |
| 2019/0293484 A1* | 9/2019 | Zhang | G06F 1/1643 |
| 2019/0306296 A1* | 10/2019 | Cheng | G02F 1/133308 |

(Continued)

FOREIGN PATENT DOCUMENTS

| | | |
|---|---|---|
| CN | 204993516 U | 1/2016 |
| CN | 105509707 A | 4/2016 |
| CN | 105681557 A | 6/2016 |

(Continued)

OTHER PUBLICATIONS

Extended European Search Report Issued in EP App. No. 19182651.0, dated Oct. 23, 2019, Germany, 8 pages.

(Continued)

*Primary Examiner* — Quoc D Tran
(74) *Attorney, Agent, or Firm* — Arch & Lake LLP

(57) ABSTRACT

Provided is an electronic device, comprising a display panel, comprising a display region and a frame, wherein the frame is provided with a through hole; and a laser sensor, disposed to be aligned with the through hole in a preset state; wherein in the preset state, the laser sensor transmits a first signal to a light-out side of the display panel and receives a second signal through the through hole.

14 Claims, 8 Drawing Sheets

(56) References Cited

U.S. PATENT DOCUMENTS

2020/0244795 A1* 7/2020 Zhang .................. G09G 5/10
2020/0348823 A1* 11/2020 Cheng ................ G06F 3/0482

FOREIGN PATENT DOCUMENTS

| CN | 106657456 A | 5/2017 |
| CN | 106940584 A | 7/2017 |
| CN | 107608454 A | 1/2018 |
| CN | 107911554 A | 4/2018 |
| CN | I07896274 A | 4/2018 |
| CN | I07968883 A | 4/2018 |
| JP | 2011109289 A | 6/2011 |
| JP | 2018510400 A | 4/2018 |

OTHER PUBLICATIONS

Chinese Office Action issued in CN App.. No. 201810681248.7, dated Jan. 2, 2020, 6 pages.
State Intellectual Property Office of the People's Republic of China, Office Action and Search Report Issued in Application No. 2018106812487, dated Jul. 20, 2020, 21 pages, (Submitted with Machine Translation).
European Patent Office, Office Action Issued in Application No. 19182651.0, dated Oct. 22, 2021, Netherlands, 8 pages.

* cited by examiner

ELECTRONIC DEVICE

CROSS REFERENCE TO RELATED APPLICATIONS

This application claims priority to Chinese Patent Application No. 201810681248.7 filed on Jun. 27, 2018, the entire content of which is incorporated herein by reference.

TECHNICAL FIELD

The present disclosure relates to an electronic device.

BACKGROUND

At present, a full screen (may also be referred to as full display) has become a development trend for terminals such as a mobile phone. However, a real full screen cannot be implemented for mobile phones due to limitations of elements such as a sensor, an antenna, and a camera.

Generally, in order to emit and receive a signal by a distance sensor, it is required to open a hole at a side of a mobile phone screen, thus resulting in a lower area ratio of a front screen of a mobile phone.

SUMMARY

In view of this, the present disclosure provides an electronic device.

According to an aspect of the present disclosure, there is provided an electronic device. The device may include: a display panel including a display region, a frame, where the frame is provided with a through hole; and a laser sensor arranged to be aligned with the through hole in a preset state.

In the preset state, the laser sensor emits a first signal to a light-out side of the display panel and receives a second signal through the through hole.

It is understood that the above general descriptions and subsequent detailed descriptions are merely illustrative and explanatory and shall not constitute limitations to the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1A:
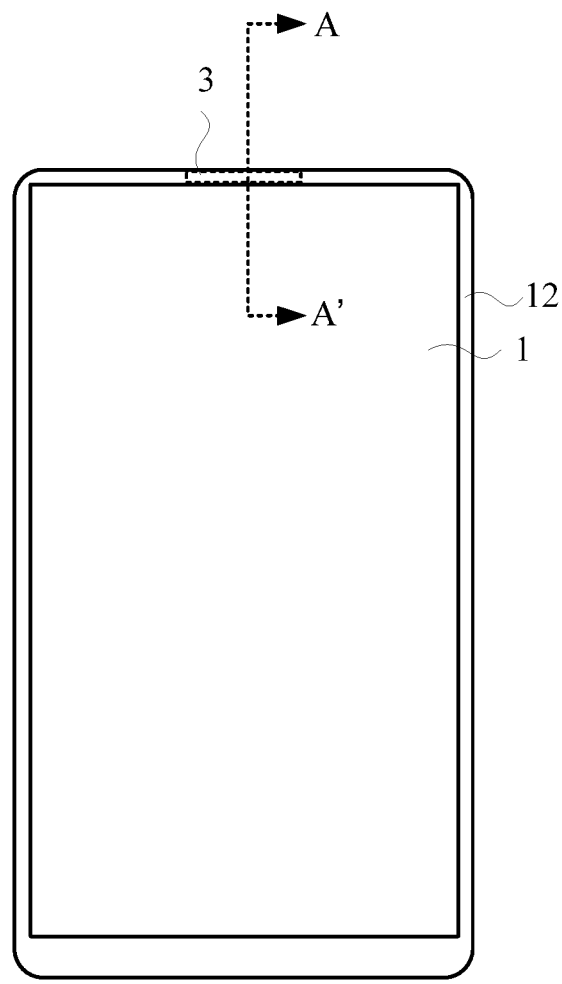
FIG. 1A is a schematic diagram illustrating a structure of an electronic device according to some embodiments of the present disclosure.
Figure 1B:
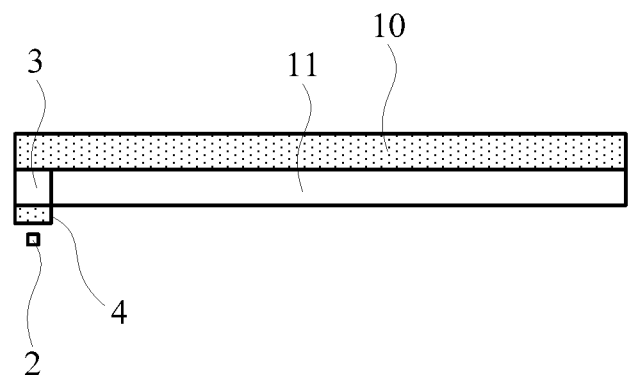
FIG. 1B is a schematic diagram illustrating a section along AA' of the electronic device shown in FIG. 1A.

Embodiments will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims FIG. 1A is a schematic diagram illustrating a structure of an electronic device according to some embodiments of the present disclosure. FIG. 1B is a schematic diagram illustrating a section along AA' of the electronic device shown in FIG. 1A. The electronic device may be a mobile phone, a tablet computer and so on. The embodiments of the present disclosure will be described below illustratively with the electronic device as a mobile phone.

As shown in FIG. 1A and FIG. 1B, the electronic device includes:

a display panel 1 including a display region 11 and a frame 12, where the frame 12 includes with a through hole 3; and a laser sensor 2 disposed to be aligned with the through hole 3 in a preset state.

In the preset state, the laser sensor 2 emits a first signal and receives a second signal through the through hole 3. The laser sensor 2 may determine a distance between an object on a side of a light-out direction of the display panel 1 and the display panel 1 according to the received second signal. When the laser sensor 2 is aligned with the through hole 3, i.e., the laser sensor 2 is in a preset state, the emission and reception of the signals pass through the through hole 3. When the laser sensor 2 is unaligned with the through hole 3, i.e., the laser sensor 2 is not in the preset state, the emission and reception of the signals does not pass through hole 3 so that the laser sensor 2 may emit signals to the outside environment of the electronic device and receive signals from the outside environment of the electronic device.

In some embodiments, as shown in FIG. 1B, the electronic device may also include a top layer glass 10. The top layer glass 10 may cover only on the display region 11. In this case, the through hole 3 on the frame 12 is not covered by the top layer glass 10, so that the laser sensor 2 has good performance in emitting the first signal and receiving the second signal. Alternatively, the top layer glass 10 may also cover the display region 11 and the frame 12. In this case, the through hole 3 on the frame 12 is covered by the top layer glass 10, so that the external appearance of the electronic device is more beautiful.

Here, when the electronic device also includes a receiver, the receiver may also transmit a voice out of the electronic device through the through hole 3.

The top layer glass 10 may be arranged according to requirements. The embodiments of the present disclosure will be illustrated below with the top layer glass 10 covering the display region 11 and the frame 12.

In some embodiments, as shown in FIG. 1B, a side that is on the laser sensor 2 and close to the display panel 1 may also be provided with a bottom layer glass 4. Since the laser sensor 2 may move relative to the display panel 1 in a direction parallel to the display panel 1, a damage caused to the laser sensor 2 due to a friction during a movement process of the laser sensor 2 may be effectively avoided by arranging the bottom layer glass 4.

By arranging the through hole 3 on the frame 12 of the display panel 1, the laser sensor 2 may emit the first signal to the light-out direction of the display panel 1 and receive the second signal through the through hole 3. Thus, it is not required to arrange the laser sensor 2 on a front surface of the electronic device, so as to increase an area ratio of the display region 11 of the display panel 1 to the front surface of the electronic device, thereby facilitating implementation of a full screen.

Figure 2A:
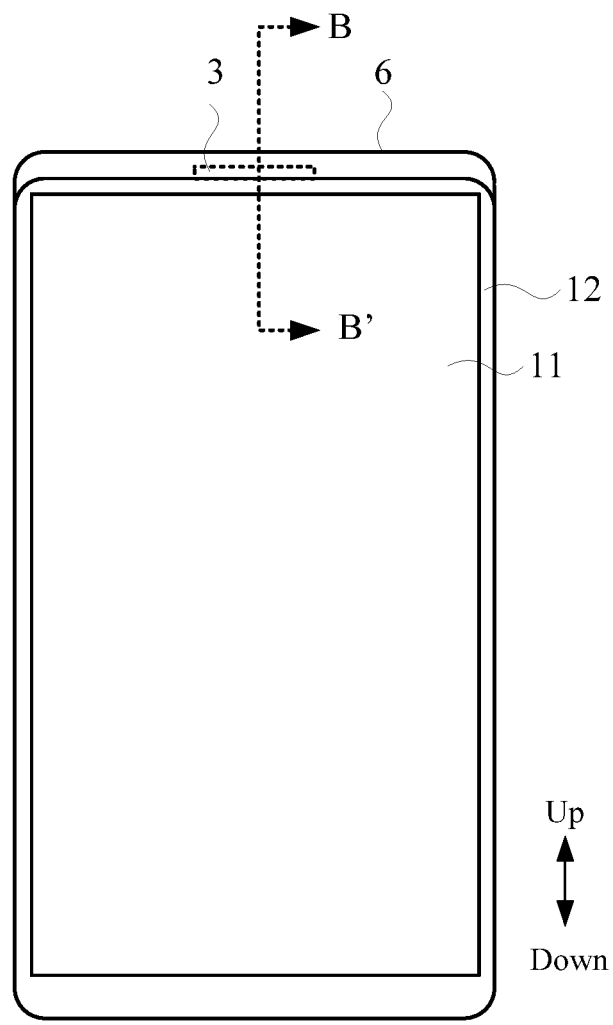
FIG. 2A is a schematic diagram illustrating a structure of an electronic device according to some embodiments of the present disclosure.
Figure 2B:
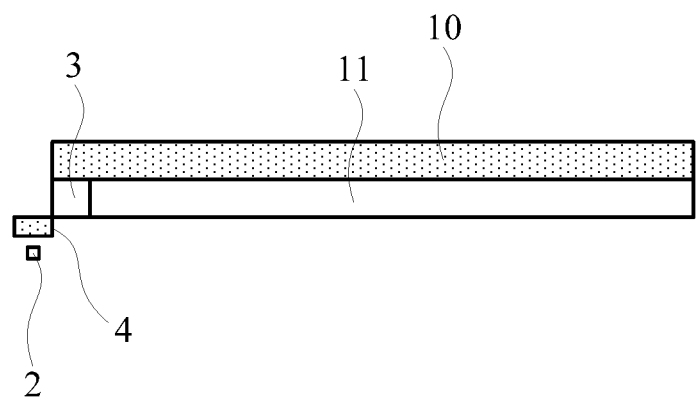
FIG. 2B is a schematic diagram illustrating a section along BB' of the electronic device shown in FIG. 2A.

FIG. 2A is a schematic diagram illustrating a structure of an electronic device according to some embodiments of the present disclosure. FIG. 2B is a schematic diagram illustrating a section taken along BB' of the electronic device shown in FIG. 2A. As shown in FIG. 2A and FIG. 2B, the laser sensor may move relative to the display panel 1 in the direction parallel to the display panel 1.

In some embodiments, the laser sensor 2 may move relative to the display panel 1 in the direction parallel to the display panel 1, including the cases that the laser sensor 2 may pop out from the frame 12 of the electronic device, and also including the cases, as shown in FIG. 2A and FIG. 2B, an orthogonal projection of the laser sensor 2 in the direction parallel to a plane where the display panel 1 is located is not allowed to fall on the display panel 1 by sliding down the display panel 1 or sliding up a back plate 6. When the display panel 1 is slidden down, the back plate 6 is slidden up or the laser sensor 2 is popped out from the frame 12, the laser sensor 2 is not in the preset state. Otherwise, the laser sensor 2 is in the preset state. Where a region corresponding to the laser sensor 2 may also be provided with a front camera and so on.

Figure 3:
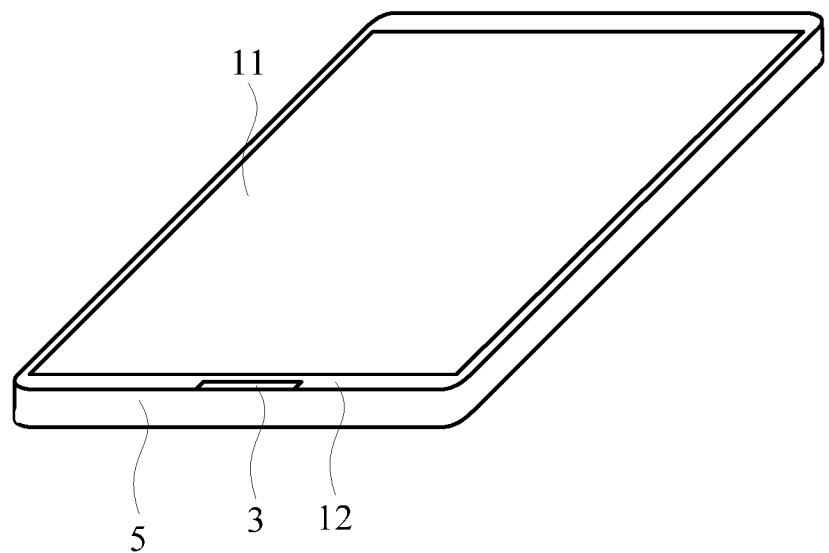
FIG. 3 is a schematic diagram illustrating a structure of an electronic device according to some embodiments of the present disclosure.

FIG. 3 is a schematic diagram illustrating a structure of an electronic device according to some embodiments of the present disclosure. As shown in FIG. 3, on the basis of FIG. 1A, FIG. 1B, FIG. 2A and FIG. 2B, the electronic device may also include:

a side wall 5, where the through hole 3 is provided at an end side that is on the frame 12 and close to the side wall 5.

In some embodiments, the through hole 3 may be located away from the display region 11 of the display panel 1 as possible by arranging the through hole 3 at a connection between the frame 12 and the side wall 5, so that the display region 11 of the display panel 1 may be maximized, thereby increasing the area ratio of the display region 11 of the display panel 1 to the front surface of the electronic device. Here, structures such as wiring corresponding to a pixel circuit in the display panel 1 may be arranged in a frame region of the display panel 1.

Optionally, the electronic device may also include: a processor (such as a processor 720 shown in FIG. 7) connected with the laser sensor.

In a case that the laser sensor 2 moves relative to the display panel 1, that is, the laser sensor 2 moves to be unaligned with the through hole 3, the processor may configure a first power, a first gain and a first integral time, so that the laser sensor 2 may emit the first signal according to the first power and process the received second signal according to the first gain and the first integral time. When the laser sensor 2 is unaligned with the through hole 3, the emission and reception of the signals does not pass through hole 3 so that the laser sensor 2 may emit signals to the outside environment of the electronic device and receive signals from the outside environment of the electronic device. Stated another way, in this case, the emission and reception of the signals does not pass through the top glass 10, and thus the first power, the first gain and the first integral time may be provided with a relatively smaller value.

In a case that the laser sensor 2 does not move relative to the display panel 1, that is, the laser sensor 2 is aligned with the through hole 3, the processor may configure at least one of the following: a second power, a second gain, and a second integral time, so that the laser sensor 2 may emit the first signal according to the second power, process the received signal according to the second gain, and process the received second signal according to the second integral time. When the laser sensor 2 is aligned with the through hole 3, the emission and reception of the signals pass through hole 3. Stated another way, in this case, the emission and reception of the signals pass through the top glass 10, and thus the second power, the second gain and the second integral time may be provided with a relatively larger value.

Where the second power is greater than the first power, the second gain is greater than the first gain, and the second integral time is greater than the first integral time.

In some embodiments, as shown in FIG. 2B, the projection of the laser sensor 2 in the direction parallel to the display panel 1 is not allowed to fall on the display panel 1 by sliding down the display panel 1 or sliding up the back plate 6. In this case, the first signal emitted by the laser sensor 2 and the second signal received by the laser sensor 2 both not pass through the through hole 3 in the frame 12 of the display panel 1 nor pass through the top layer glass 10, thereby reducing consumption. Thus, the signal may be emitted with a smaller first power. Further, a larger current value may be obtained only by processing the received signal with a smaller first gain and a smaller first integral time.

However, in the case shown in FIG. 1B, the projection of the laser sensor 2 in the direction parallel to the display panel 1 falls on the display panel 1, and the first signal emitted by the laser sensor 2 and the second signal received by the laser sensor 2 both pass through the through hole 3 in the frame 12 and the top layer glass 10, thereby increasing consumption. Thus, the signal may be emitted with a larger second power and a signal strength reflected back to the laser sensor 2 is also larger, and thus a larger current value may be obtained. The received signal may also be processed with a larger second gain, so that a larger current value may still be obtained even in the case of a smaller received signal. The received signal may also be processed with a larger second integral time, so that a larger current value may still be obtained even in the case of a smaller received signal.

As shown in FIG. 1B and FIG. 2B, the electronic device may also include: a bottom layer glass 4 arranged at a side that is on the laser sensor 2 and close to the display panel 1.

In an example, since the laser sensor 2 may move relative to the display panel 1 in the direction parallel to the display panel 1, a damage caused to the laser sensor 2 due to a friction during a movement process may be prevented by arranging the bottom layer glass 4. Further, when the projection of the laser sensor 2 in the direction parallel to the display panel 1 does not fall on the display panel 1, an external foreign matter may be prevented from entering the laser sensor 2.

Figure 4A:
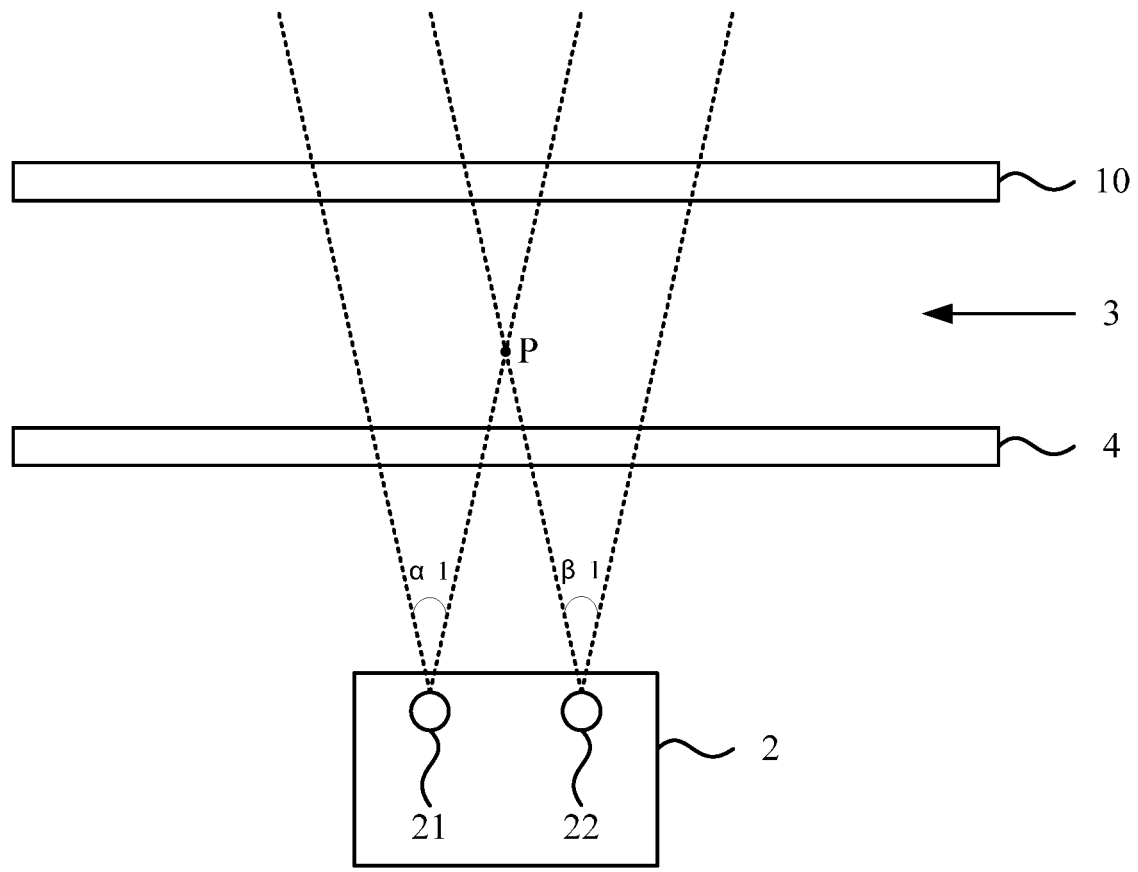
FIG. 4A is a schematic diagram illustrating a section of an electronic device according to some embodiments of the present disclosure.
Figure 4B:
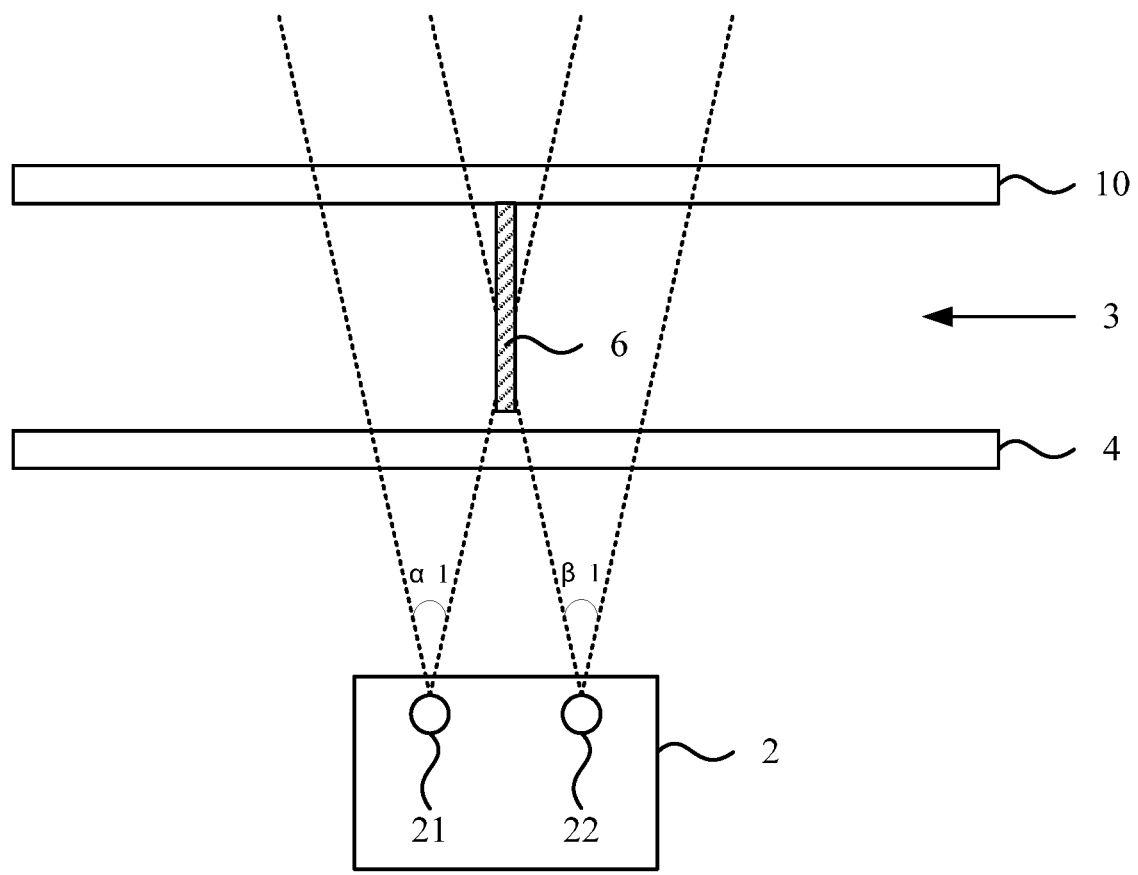
FIG. 4B is a schematic diagram illustrating a section of an electronic device according to some embodiments of the present disclosure.

FIG. 4A and FIG. 4B are schematic diagrams illustrating a section of an electronic device according to some embodiments of the present disclosure. An edge of an intersection region between an emitting region in which the laser sensor 2 emits a first signal and a receiving region in which a second signal is received by the laser sensor 2 is located in the through hole.

In some embodiments, as shown in FIG. 4A, the laser sensor 2 includes an emitter 21 and a receiver 22. The emitter 21 is configured to emit the first signal and the receiver 22 is configured to receive the second signal. A field of view (FOV) corresponding to the emitting region in which the emitter 21 emits the first signal is $\alpha 1$ and a FOV corresponding to the receiving region in which the second signal is received by the receiver 22 is $\beta 1$. As shown in FIG. 4A, the emitting region and the receiving region may intersect at a particular position in a space.

If the edge of the intersection region between the emitting region and the receiving region is located in the through hole 3, the edge of the intersection region is indicated by a point P in the section views of FIG. 4A and FIG. 4B. As shown in FIG. 4A, the edge P of the intersection region is located in the through hole 3. In a case of presence of the top layer glass 10 and the bottom layer glass 4, the edge P of the intersection region is located between the top layer glass 10 and the bottom layer glass 4.

In this case, the first signal emitted by the emitter 21 may irradiate onto the top layer glass 10 within the receiving region and may be received by the receiver with a high probability after being reflected and/or refracted by the top layer glass 10. This part of the laser signal is not reflected by an object outside the electronic device into the electronic device, so this part of the laser signal belongs to background noise.

In some embodiments, as shown in FIG. 4B, the electronic device may also include:

a first baffle 6 arranged in the through hole 3 and located on an angle bisector of an included angle formed by intersecting the emitting region and the receiving region.

A surface of the first baffle 6 is coated with an absorbing material and the absorbing material is configured to absorb the first signal emitted by the laser sensor 2. For example, the absorbing material may include bakelite (PF) or black toner.

The first baffle 6 is arranged in the through hole 3 and located on the angle bisector of the included angle formed by intersecting the emitting region and the receiving region. The surface of the first baffle 6 is coated with the absorbing material so that the first baffle 6 may absorb the first signal emitted to the first baffle 6 by the emitter 21, thereby effectively preventing the first signal emitted by the emitter 21 from being received by the receiver 22, and further reducing a background noise.

It is to be noted that a length (perpendicular to the section shown in FIG. 4B) and a height (perpendicular to the top layer glass 10 and the bottom layer glass 4) of the first baffle 6 may be set according to requirements. The height of the first baffle 6 may be greater than the shortest distance from the top layer glass 10 to the edge of the intersection region to prevent the first signal emitted by the emitter 21 from being received by the receiver 22, thereby effectively reducing background noise.

Optionally, as shown in FIG. 4B, the first baffle 6 and the bottom layer glass 4 are a first distance apart. In some embodiments, the first distance is greater than zero. For example, the first distance may be in the range of 0 mm to 2.5 mm, or more preferably in the range of 1 mm to 2.5 mm. When the laser sensor 2 moves relative to the display panel 1 in the direction parallel to the display panel 1, since the bottom layer glass 4 move along with the laser sensor 2, therefore setting the first baffle 6 and the bottom layer glass 4 are a first distance apart, so that a damage caused to the bottom layer glass 4 due to a friction of the first baffle 6 during a movement of the bottom layer glass 4 may be effectively avoided.

Figure 5:
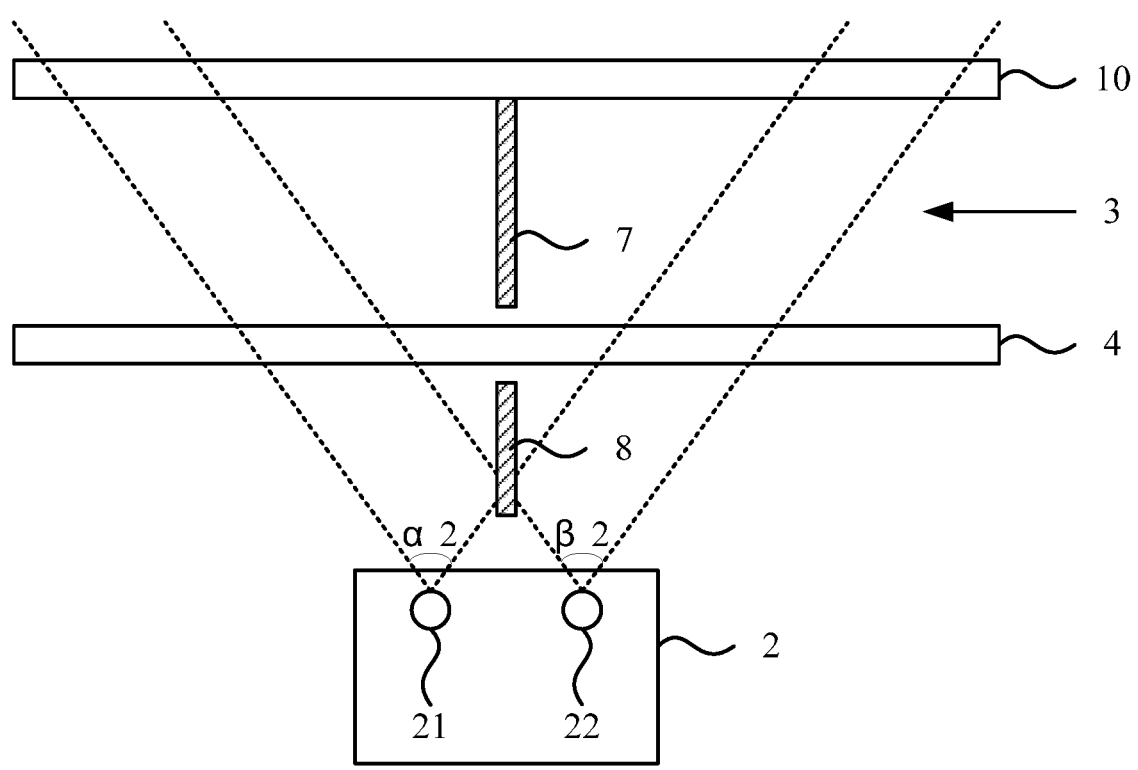
FIG. 5 is a schematic diagram illustrating a section of an electronic device according to some embodiments of the present disclosure.

FIG. 5 is a schematic diagram illustrating a section of an electronic device according to some embodiments of the present disclosure. As shown in FIG. 5, if the edge of the intersection region between the emitting region in which the laser sensor 2 emits the first signal and the receiving region in which the second signal is received by the laser sensor 2 is located between the bottom layer glass 4 and the laser sensor 2, the electronic device may also include: a second baffle 7 and a third baffle 8. The second baffle 7 is arranged in the through hole 3. The third baffle 8 is arranged between the bottom layer glass and the laser sensor.

The second baffle 7 and the third baffle 8 are located on an angle bisector of an included angle formed by intersecting the emitting region and the receiving region.

In some embodiments, surfaces of the second baffle 7 and the third baffle 8 are coated with an absorbing material to absorb the first signal emitted by the laser sensor 2 onto the second baffle 7 and the third baffle 8.

In some embodiments, as shown in FIG. 5, the laser sensor 2 may include the emitter 21 and the receiver 22, where the emitter 21 is used for emitting the first signal and the receiver 22 is used for receiving the second signal. Where a FOV corresponding to the emitting region in which the emitter 21 emits the first signal is $\alpha 2$ and a FOV corresponding to the receiving region in which the second signal is received by the receiver 22 is $\beta 2$. The emitting region and the receiving region may intersect at a particular position in a space.

If the edge of the intersection region between the emitting region and the receiving region is located between the bottom layer glass 4 and the laser sensor 2, the first signal emitted by the emitter 21 will not only irradiate onto the top layer glass 10 within the receiving region, but also onto the bottom layer glass 4 within the receiving region. Thus, a part of the first signal may be received by the receiver 22 with high probability after being reflected and/or refracted by the top layer glass 10 and the bottom layer glass 4 within the receiving region. This part of laser signal is not reflected into the electronic device by an object outside the electronic device and thus this part of laser signal belongs to background noise. A larger background noise means a lower accuracy of sensing the laser signal by the laser sensor 2.

In some embodiments, as shown in FIG. 5, the second baffle 7 is arranged in the through hole 3 and located on the angle bisector of the included angle formed by intersecting the emitting region and the receiving region. Since the surface of the second baffle 7 is coated with the absorbing material, the second baffle 7 may absorb the first signal emitted by the emitter 21 onto the second baffle 7, thereby effectively preventing the first signal emitted by the emitter 21 from being received by the receiver 22.

Further, the third baffle 8 is arranged between the bottom layer glass 4 and the laser sensor 2 and located on the angle bisector of the included angle formed by intersecting the emitting region and the receiving region. Since the surface of the third baffle 8 is coated with the absorbing material, the third baffle 8 may absorb the first signal emitted by the emitter 21 onto the third baffle 8, thereby effectively preventing the first signal emitted by the emitter 21 from being received by the receiver 22.

The first signal received by the receiver 22 from the emitter 21 may be effectively reduced by arranging the second baffle 7 and the third baffle 8. In this case, the background noise is reduced and the accuracy of sensing signals by the laser sensor is improved.

It is to be noted that lengths (perpendicular to the section shown in FIG. 5) and heights (perpendicular to the top layer glass 10 and the bottom layer glass 4) of the second baffle 7 and the third baffle 8 may be set according to requirements.

Optionally, the second baffle 7 and the bottom layer glass 4 are a second distance apart, and the third baffle 8 and the bottom layer glass 4 are a third distance apart. In some embodiments, as shown in FIG. 5, the second distance and the third distance are both greater than zero. When the laser sensor 2 moves relative to the display panel in the direction parallel to the display panel, since the bottom layer glass 4 will move along with the laser sensor 2, a damage caused to the bottom layer glass 4 due to frictions of the second baffle 7 and the third baffle 8 during a movement of the bottom layer glass 4 may be effectively avoided by arranging the second distance and the third distance.

Figure 6:
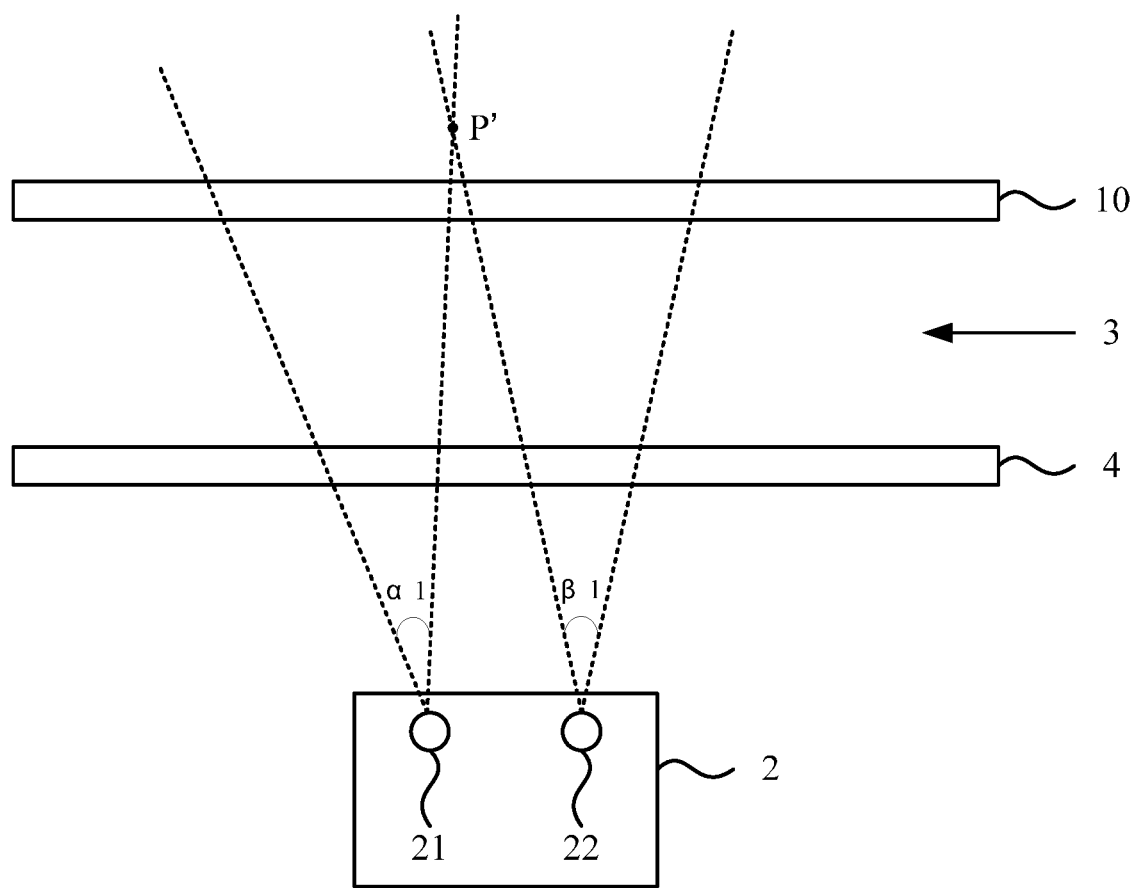
FIG. 6 is a schematic diagram illustrating a section of an electronic device according to some embodiments of the present disclosure.

FIG. 6 is a schematic diagram illustrating a section of an electronic device according to some embodiments of the present disclosure. As shown in FIG. 6, the laser sensor 2 includes:

a receiver 22 configured to receive a second signal; and
a transmitter 21 configured to emit a first signal.

In some embodiments, as shown in FIG. 6, a FOV at which the emitter 21 emits the first signal is same as shown in FIG. 4A, that is, both are α1, and a FOV at which the receiver 22 receives the second signal is same as shown in FIG. 4A, that is, both are β1. Thus, a region in which the emitter 21 emits the first signal is deflected away from a side of the receiver so that the edge of the intersection region between the emitting region and the receiving region is located outside the top layer glass 10, thereby preventing the first signal emitted by the emitter 21 from being received by the receiver 22.

As shown in FIG. 6, the edge P' of the intersection region between the emitting region and the receiving region is located outside the top layer glass 10, so that the first signal emitted by the emitter 21 is prevented from being received by the receiver 22. Thus, the background noise is effectively reduced and the accuracy of sensing the laser signal by the laser sensor 2 is improved.

Figure 8:
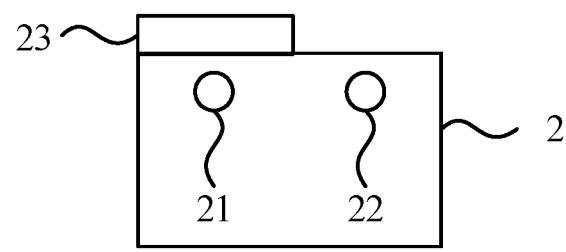
FIG. 8 is a schematic diagram illustrating a structure of a laser sensor according to some embodiments of the present disclosure.

Optionally, as shown in FIG. 8, the electronic device also includes: a convex lens 23 arranged in a light-out direction of the emitter 21 of the laser sensor 2.

In some embodiments, by arranging the convex lens 23 in the light-out direction of the emitter 21 of the laser sensor 2, the first signal emitted by the emitter may be converged and the FOV of the first signal may be narrowed, so that the edge of the intersection region between the emitting region and the receiving region moves outside of the electronic device to prevent the first signal emitted by the emitter from being received by the receiver 22 as possible, thereby reducing background noise and improving the accuracy of sensing laser signal by the laser sensor 2.

In some embodiments, an inner wall of the through hole is coated with an absorbing material to absorb the first signal emitted by the laser sensor to the inner wall of the through hole.

When the through hole is small in size, for example, the width of the through hole is less than 1 mm, the first signal emitted by the emitter may firstly irradiate onto the inner wall of the through hole before arriving at the top layer glass as different from the case shown in FIG. 4A, FIG. 4B, FIG. 5 or FIG. 6. If the inner wall of the through hole may reflect a laser signal, the first signal emitted by the emitter will be changed in transmission direction, resulting in that the first signal with a changed transmission direction irradiates onto the top layer glass 10 or the bottom layer glass 4 within the receiving region and then reflected and/or refracted into the receiver to form a background noise.

By coating the inner wall with the absorbing material for absorbing the first signal emitted by the laser sensor, the laser signal emitted by the emitter and irradiates onto the inner wall of the through hole may be absorbed to effectively prevent the part of signals reflected and/or refracted by the inner wall of the through hole from entering the receiver and forming into background noise, further ensuring the sensing accuracy of the laser sensor.

In some embodiments, the inner wall that is on the through hole and close to the emitter 21 may be coated with the absorbing material to prevent the inner wall of the through hole from reflecting the first signal emitted by the emitter 21 to the receiver 22.

Figure 7:
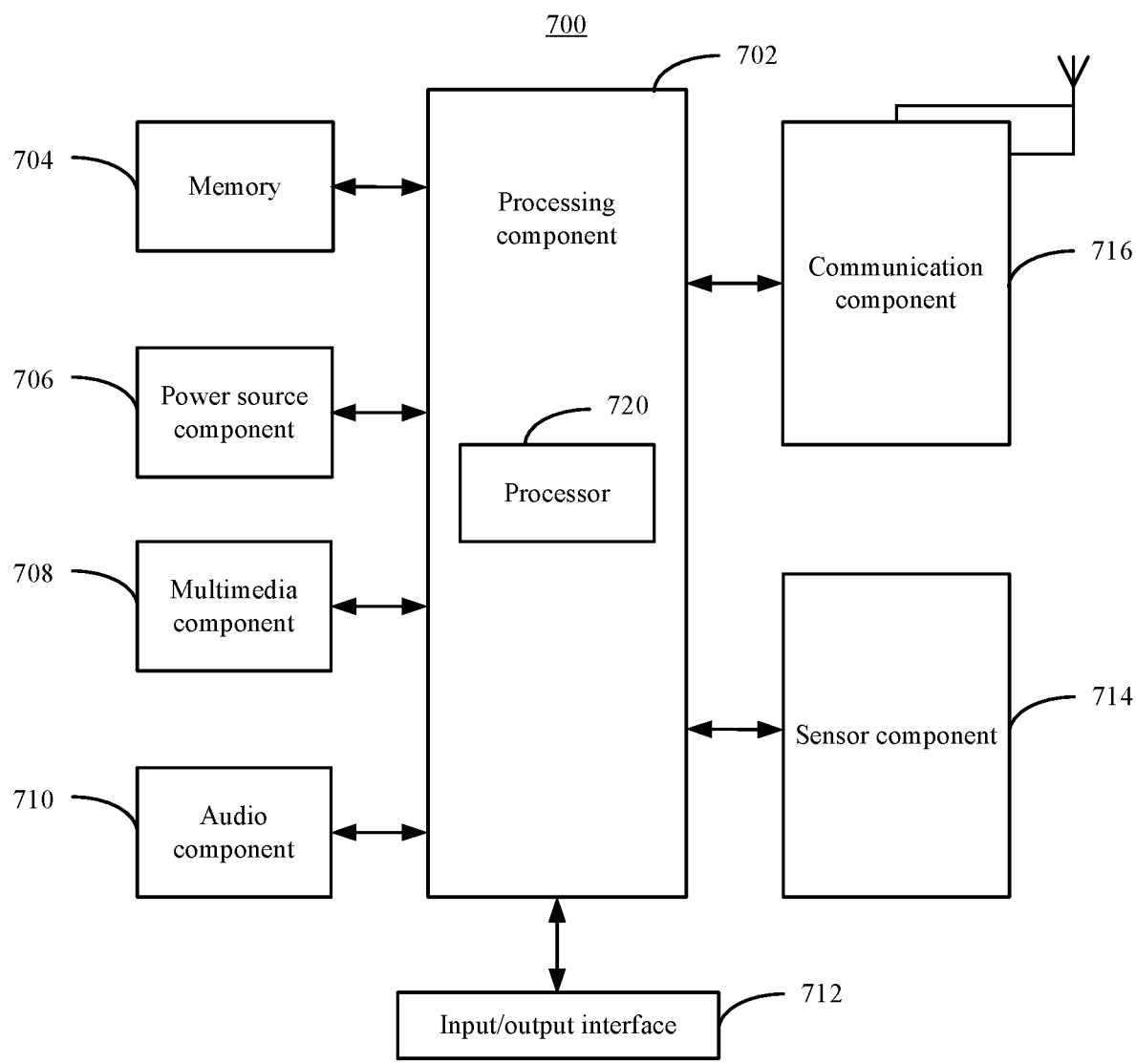
FIG. 7 is a block diagram illustrating an apparatus for sensing a distance according to some embodiments of the present disclosure.

FIG. 7 is a block diagram illustrating an apparatus 700 for sensing a distance according to some embodiments of the present disclosure. For example, the apparatus 700 may be a mobile phone, a computer, a digital broadcast terminal, a message transceiver, a game console, a tablet device, a medical device, a fitness device, a personal digital assistant, and so on.

As shown in FIG. 7, the apparatus 700 may include one or more of the following components: a processing component 702, a memory 704, a power supply component 706, a multimedia component 708, an audio component 710, an input/output (I/O) interface 712, a sensor component 714 and a communication component 716.

The processing component 702 generally controls the overall operation of the apparatus 700, such as operations associated with display, phone call, data communication, camera operation, and recording operation. The processing component 702 may include one or more processors 720 to execute instructions. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store different types of data to support operation at the apparatus 700. Examples of such data include instructions for any application or method that operates on the apparatus 700, contact data, phonebook data, messages, pictures, videos, and so on. The memory 704 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 706 may provide power for different components of the apparatus 700. The power supply component 706 may include a power supply management system, one or more power sources, and other components associated with generating, managing and distributing power for the apparatus 700.

The multimedia component 708 includes a screen providing an output interface between the apparatus 700 and a user. In some embodiments, the screen may include a Liquid Crystal Display (LCD) and/or a Touch Panel (TP). If the screen includes a touch panel, the screen may be implemented as a touch screen to receive an input signal from a user. The touch panel includes one or more touch sensors to sense touch, slip, and gestures on the touch panel. The touch sensor may not only sense the boundary of a touch or slip operation but also detect duration and pressure relating to the touch or slip operation. In some embodiments, the multimedia component 708 may include a front-facing camera and/or a rear camera. When the apparatus 700 is in an operating mode, such as in a shooting mode or a video mode, the front-facing camera and/or the rear camera may receive external multimedia data. Each of the front-facing camera and the rear camera may be a fixed optical lens system or may be capable of focal length and optical zoom.

The audio component 710 is configured to output and/or input an audio signal. For example, the audio component 710 includes a microphone (MIC). When the apparatus 700 is in an operating mode, for example, in a call mode, a recording mode or a speech recognition mode, the microphone is configured to receive an external audio signal. The received audio signal may be further stored in the memory 704 or sent via the communication component 716. In some embodiments, the audio component 710 also includes a speaker for outputting an audio signal.

The I/O interface 712 provides an interface between the processing component 702 and a peripheral interface module. The peripheral interface module may be a keyboard, click wheel, a button and the like. Such buttons may include but not limited to: a home button, a volume button, a start button, and a lock button.

The sensor component 714 includes one or more sensors for evaluating states of the apparatus 700 in different aspects. For example, the sensor component 714 may detect the on/off state of the apparatus 700, and relative locations of components, for example, the component is a display and a keypad of the apparatus 700. The sensor component 714 may also detect a position change of the apparatus 700 or one component of the apparatus 700, the presence or absence of contact of a user with the apparatus 700, an orientation or acceleration/deceleration of the apparatus 700 and a temperature change of the apparatus 700. The sensor component 714 may include a proximity sensor configured to detect presence of a nearby object without any physical contact. The sensor component 714 may also include an optical sensor, such as a CMOS or CCD image sensor to be used in imaging application. In some embodiments, the sensor component 714 may also include an acceleration sensor, a gyroscope sensor, a magnetic sensor, a pressure sensor, or a temperature sensor.

The communication component 716 is configured to facilitate wired or wireless communication between the apparatus 700 and other devices. The apparatus 700 may access a wireless network based on a communication standard, such as WIFI, 2G or 3G, or a combination thereof. In some embodiments, the communication component 716 may receive a broadcast signal or broadcast-related information from an external broadcast management system via a broadcast channel. In some embodiments, the communication component 716 may also include a Near Field Communication (NFC) module to facilitate short-range communications. For example, the NFC module may be implemented based on Radio Frequency Identification (RFID) technology, Infrared Data Association (IrDA) technology, Ultra Wide Band (UWB) technology, Bluetooth (BT) technology and other technology.

In some embodiments, the apparatus 700 may be implemented by one or more of an Application-Specific Integrated Circuit (ASIC), a Digital Signal Processor (DSP), a Digital Signal Processing Device (DSPD), a Programmable Logical Device (PLD), a Field Programmable Gate Array (FPGA), a controller, a microcontroller, a microprocessor or other electronic elements.

In some embodiments, there is provided a non-transitory computer-readable storage medium storing instructions, for example, a storage medium 704 storing instructions. The instructions may be executed by the processor 720 of the apparatus 700. For example, the non-transitory computer readable storage medium may be a Read-Only Memory (ROM), a Random Access Memory (RAM), CD-ROM, a magnetic tape, a floppy disk, and an optical data storage device and so on.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. An electronic device, comprising:
  a display panel comprising a display region and a frame, wherein the frame comprises a through hole;
  a laser sensor arranged to be aligned with the through hole in a preset state, wherein the laser sensor is movable relative to the display panel in a direction parallel to the display panel;
  a bottom layer glass arranged at a side that is above the laser sensor and close to the display panel;
  a second baffle in the through hole; and
  a third baffle between the bottom layer glass and the laser sensor;
  wherein in the preset state, the laser sensor emits a first signal to a light-out side of the display panel and receives a second signal through the through hole;
  wherein an edge of an intersection region between an emitting region in which the laser sensor emits the first signal and a receiving region in which the second signal is received by the laser sensor is located between the bottom layer glass and the laser sensor;

wherein the second baffle and the third baffle are located on an angle bisector of an included angle formed by intersecting a boundary of the emitting region and a boundary of the receiving region; and wherein a surface of the second baffle and a surface of the third baffle are coated with an absorbing material.

2. The electronic device according to claim 1, wherein an edge of an intersection region between an emitting region in which the laser sensor emits the first signal and a receiving region in which the second signal is received by the laser sensor is located in the through hole.

3. The electronic device according to claim 2, further comprising:

a first baffle arranged in the through hole and located on an angle bisector of an included angle formed by intersecting a boundary of the emitting region and a boundary of the receiving region;

wherein a surface of the first baffle is coated with an absorbing material.

4. The electronic device according to claim 3, wherein the first baffle and the bottom layer glass are a first distance apart.

5. The electronic device according to claim 1, wherein the second baffle and the bottom layer glass are a second distance apart; and wherein the third baffle and the bottom layer glass are a third distance apart.

6. The electronic device according to claim 1, wherein the through hole is arranged at an end side that is on the frame and close to a side wall of the electronic device.

7. The electronic device according to claim 1, further comprising:

a processor connected with the laser sensor;

wherein in a case that the laser sensor is not in the preset state, the processor performs the following configurations comprising:

assigning a first power to the laser sensor so that the laser sensor emits the first signal according to the first power; and adopting a first gain and a first integral time for the laser sensor to process the second signal according to the first gain and the first integral time.

8. The electronic device according to claim 7, further comprising:

a processor connected with the laser sensor;

wherein in a case that the laser sensor is in the preset state, the processor performs at least one of the following configurations:

assigning a second power to the laser sensor so that the laser sensor emits the first signal according to the second power;

adopting a second gain for the laser sensor to process the received second signal according to the second gain;

adopting a second integral time for the laser sensor to process the second signal according to the second integral time; and wherein the second power is greater than the first power, the second gain is greater than the first gain, and the second integral time is greater than the first integral time.

9. The electronic device according to claim 1, wherein the laser sensor comprises:

a receiver configured to receive the second signal; and an emitter configured to emit the first signal.

10. The electronic device according to claim 1, further comprising:

a convex lens in a light-out direction of an emitter of the laser sensor.

11. The electronic device according to claim 1, wherein an inner wall of the through hole is coated with an absorbing material.

12. The electronic device according to claim 1, further comprising:

a top layer glass covering the display region.

13. The electronic device according to claim 1, further comprising:

a top layer glass covering the display region and the frame.

14. The electronic device according to claim 4, wherein the display region and the frame are covered by a top layer glass, and a height of the first baffle is greater than a shortest distance from the top layer glass to the edge of the intersection region.

* * * * *